United States Patent
Hutchison et al.

(10) Patent No.: US 12,229,423 B2
(45) Date of Patent: Feb. 18, 2025

(54) READ COLLISION AVOIDANCE IN SEQUENTIAL MIXED WORKLOADS

(71) Applicant: Western Digital Technologies, Inc., San Jose, CA (US)

(72) Inventors: Neil Hutchison, Hudsonville, MI (US); Haining Liu, Irvine, CA (US); Jerry Lo, Walnut, CA (US); Sergey Anatolievich Gorobets, Edinburgh (GB)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/348,314

(22) Filed: Jul. 6, 2023

(65) Prior Publication Data

US 2024/0118821 A1 Apr. 11, 2024

Related U.S. Application Data

(60) Provisional application No. 63/413,128, filed on Oct. 4, 2022.

(51) Int. Cl.
*G06F 3/06* (2006.01)

(52) U.S. Cl.
CPC ............ *G06F 3/0635* (2013.01); *G06F 3/061* (2013.01); *G06F 3/0658* (2013.01); *G06F 3/0679* (2013.01)

(58) Field of Classification Search
CPC ...... G06F 3/061; G06F 3/0635; G06F 3/0658; G06F 3/0659; G06F 3/0679; G06F 3/0688
See application file for complete search history.

(56) References Cited

U.S. PATENT DOCUMENTS

| | | |
|---|---|---|
| 9,021,192 B1 | 4/2015 | Kang et al. |
| 9,218,283 B2 | 12/2015 | Gorobets et al. |
| 9,508,437 B2 | 11/2016 | Parker et al. |
| 9,652,379 B1 | 5/2017 | Syu et al. |
| 10,528,464 B2 | 1/2020 | Ishiyama et al. |
| 10,922,014 B1 | 2/2021 | Henze |
| 11,593,262 B1* | 2/2023 | Henze ................ G06F 12/0238 |
| 2004/0215912 A1* | 10/2004 | Vergis ................ G11C 11/4078 711/170 |
| 2012/0084484 A1* | 4/2012 | Post .................... G06F 12/0246 710/308 |
| 2013/0250677 A1 | 9/2013 | Nam et al. |
| 2018/0173460 A1 | 6/2018 | Bandic et al. |

(Continued)

*Primary Examiner* — Larry T Mackall
(74) *Attorney, Agent, or Firm* — Morgan, Lewis & Bockius LLP

(57) ABSTRACT

A data storage device processes a mixed workload including a plurality of superblocks to be written to and read from a plurality of memory dies, where each of the plurality of superblocks to be apportioned among the plurality of memory dies. The data storage device writes a first data stripe associated with a first superblock to the plurality of memory dies according to a sequential write pattern, and reads the first data stripe associated with the first superblock from the plurality of memory dies according to a sequential read pattern. The sequential write pattern causes the controller to write to the plurality of memory dies in a first order of memory dies. The sequential read pattern causes the controller to read from the plurality of memory dies in a second order of memory dies different from the first order of memory dies, thereby reducing read collisions.

11 Claims, 7 Drawing Sheets

(56) References Cited

U.S. PATENT DOCUMENTS

| | | |
|---|---|---|
| 2021/0279170 A1 | 9/2021 | Liu et al. |
| 2021/0373812 A1 | 12/2021 | Subbarao |
| 2022/0083463 A1 | 3/2022 | Muchherla et al. |
| 2024/0062823 A1* | 2/2024 | Zhou .................... G11C 16/102 |

* cited by examiner

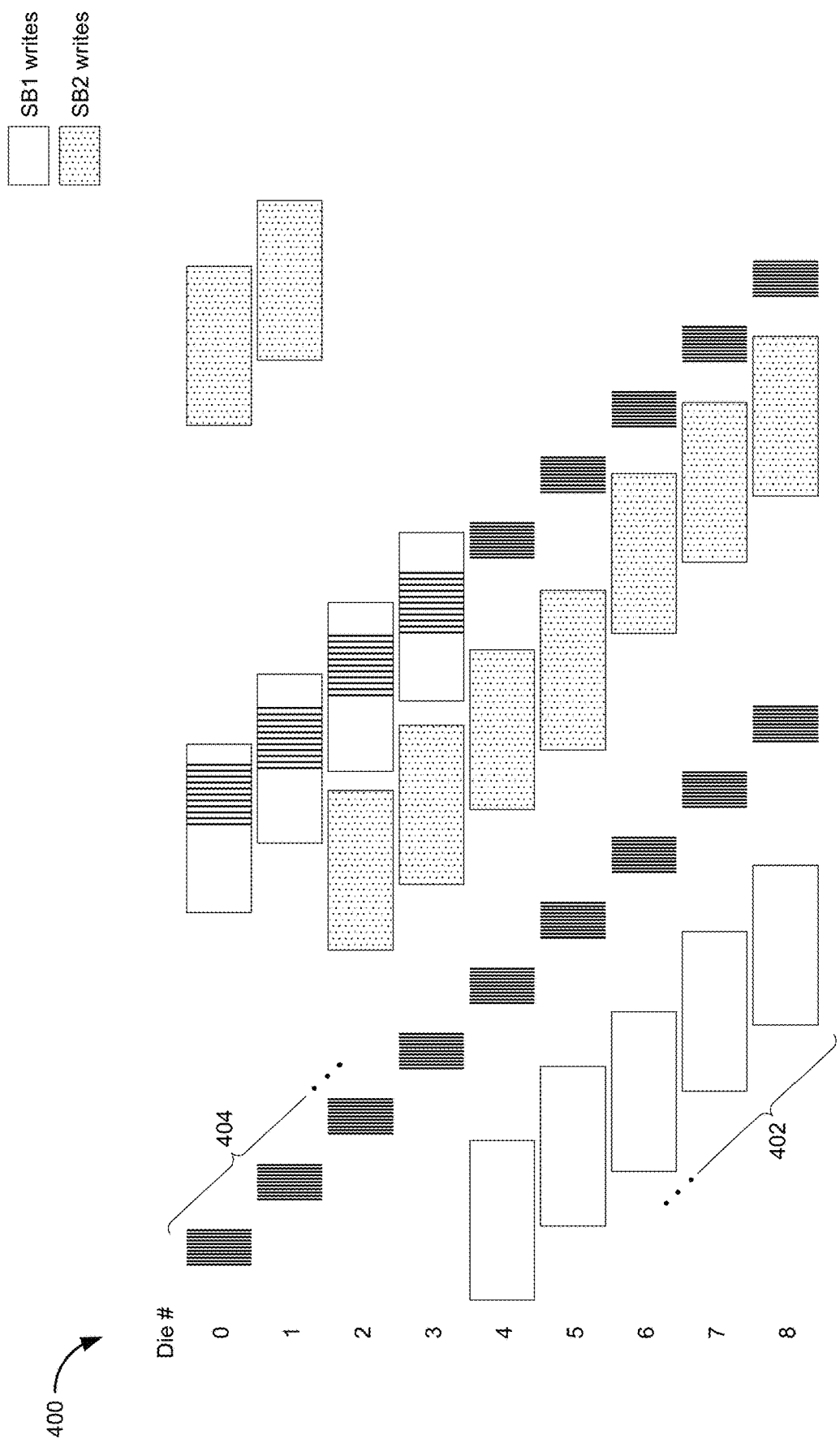

READ COLLISION AVOIDANCE IN SEQUENTIAL MIXED WORKLOADS

CROSS-REFERENCE TO RELATED APPLICATION

This application claims the benefit of U.S. Provisional Application No. 63/413,128, filed on Oct. 4, 2022, the entirety of which is incorporated herein by reference for all purposes.

BACKGROUND

Data storage devices enable users to store and retrieve data. Examples of data storage devices include non-volatile memory devices. Non-volatile memory generally retains data after a power cycle. An example of non-volatile memory is flash memory, which may include one or more arrays of not-and (NAND) cells on one or more dies. Flash memory may be found in solid-state drives (SSDs), secure digital (SD) cards, and the like.

Performance of a data storage device may be based on factors such as a data transfer rate, latency, and inputs/outputs per second (IOPS). When measuring performance based on these factors, a host may subject the data storage devices to different types of workloads (e.g., write-only, read-only, and mixed), with each type of workload corresponding to a different intended use of the data storage device.

Mixed workloads, including both write and read operations, may be used for measuring the IOPS of a data storage device. These tests can sometimes be affected by read collisions, which occur when one or more memory groups (e.g., memory dies) are subjected to read operations while they are concurrently being written. Such collisions slow down both the write and read operations involving the affected memory groups. Further, the conditions that cause these collisions tend to get worse over time, especially if the workload is a sequential workload that successively writes to and reads from the memory groups in a sequence. Thus, performance and quality of service (QoS) of data storage devices operating under these conditions tend to decrease over time.

SUMMARY

Based on the discussion above as well as other problems and disadvantages of the related art, there is a need for a system that can process sequential mixed workloads in a manner that avoids read collisions. By avoiding read collisions, the data storage device can process mixed workloads with increased IOPS-related performance.

According to one or more aspects of the read collision avoidance schemes described herein, a data storage device processing a sequential mixed workload may set and/or dynamically update its write pattern to avoid colliding with read operations. In one or more aspects, the write pattern may be alternated with respect to the read pattern, be randomly offset with respect to the read pattern, and/or use read pattern statistics to proactively avoid overlapping with read operations across the memory groups of the data storage device.

In one or more aspects, the read collision avoidance schemes described herein increase IOPS for data storage devices processing sequential mixed workloads, thereby optimizing performance and improving QoS.

BRIEF DESCRIPTION OF THE DRAWINGS

The accompanying drawings, which are included to provide a further understanding of the disclosure, are incorporated in and constitute a part of this disclosure, illustrate embodiments of the disclosure, and together with the description serve to explain principles of the disclosure. Like components are labeled with identical element numbers for ease of understanding.

FIG. 4 is an example timing diagram of a read collision avoidance scheme using write patterns with random starting dies in accordance with some implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The present description relates in general to data storage systems and methods, and more particularly to, for example, without limitation, read collision avoidance in sequential mixed workloads.

One or more implementations of the subject technology provide several performance benefits that improve the functionality of a computer. By reducing read collisions while processing sequential mixed workloads using the schemes described herein, IOPS of data storage devices may be increased, causing performance to be optimized and QoS to be improved.

Figure 1:
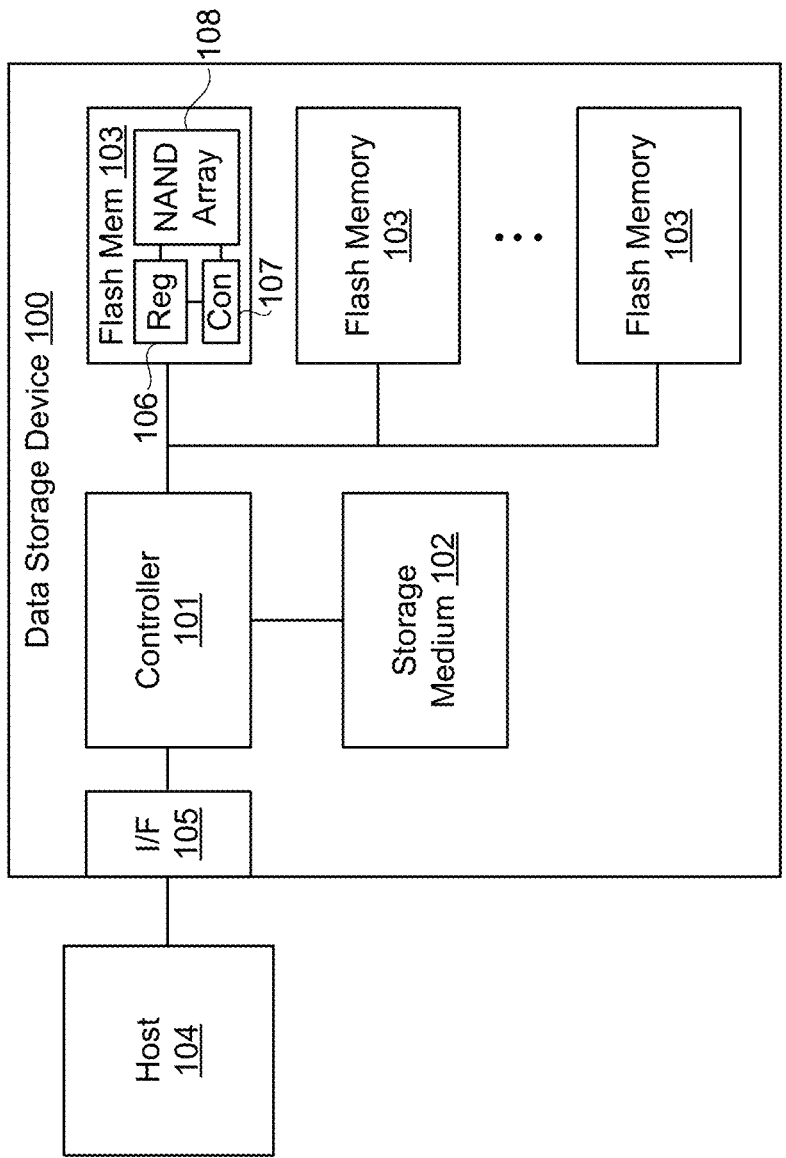
FIG. 1 is a block diagram illustrating components of an example data storage system in accordance with some implementations.

FIG. 1 is a block diagram illustrating components of an example data storage system, according to aspects of the subject technology. A data storage system may be sometimes referred to as a system, a data storage device, a storage device, a solid-state drive, a drive, or a device. As depicted in FIG. 1, In some implementations, a data storage device 100 (e.g., a solid-state drive (SSD)) includes a data storage controller 101, a storage medium 102, and a flash memory array including one or more flash memory 103. The data storage controller 101 may be sometimes referred to as a controller. A controller may include one or more controllers. The controller 101 may use the storage medium 102 for temporary storage of data and information used to manage the data storage device 100. The controller 101 may include several internal components (not shown), such as a read-only memory, other types of memory, a flash component interface (e.g., a multiplexer to manage instruction and data transport along a serial connection to the flash memory 103), an input/output (I/O) interface, error correction circuitry, and the like. In some implementations, some or all of these elements of the controller 101 may be integrated into a single chip. In other aspects, these elements may be separated on their own printed circuit board (PCB).

In some implementations, aspects of the subject disclosure may be implemented in the data storage device 100. For example, aspects of the subject disclosure may be integrated with the function of the data storage controller 101 or may be implemented as separate components for use in conjunction with the data storage controller 101.

The controller 101 may also include one or more processors that may be configured to execute code or instructions to perform the operations and functionality described herein, manage request flow and address mappings, and to perform calculations and generate commands. The one or more processors of the controller 101 may be configured to monitor and/or control the operation of the components in the data storage controller 101. A processor may be a microprocessor, a microcontroller, or a digital signal processor (DSP). A processor may be implemented using, for example, an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on read-only-memory (ROM) within the controller 101 and/or its processor. One or more sequences of instructions may be software stored and read from the storage medium 102, the flash memory 103, or received from a host device 104 (e.g., via a host interface 105). ROM, the storage medium 102, the flash memory 103, represent examples of machine or computer readable media on which instructions/code executable by the controller 101 and/or its processor(s) may be stored. Machine or computer readable media may generally refer to any medium or media used to provide instructions to the controller 101 and/or its processor, including volatile media, such as dynamic memory used for the storage media 102 or for buffers within the controller 101, and non-volatile media, such as electronic media, optical media, and magnetic media. A medium or media may be a non-transitory medium or media.

In some implementations, the controller 101 may be configured to store data received from the host device 104 in the flash memory 103 in response to a write command from the host device 104. The controller 101 is further configured to read data stored in the flash memory 103 and to transfer the read data to the host device 104 in response to a read command from the host device 104. A host device 104 may be sometimes referred to as a host, a host system, or a host computer.

The host device 104 represents any device configured to be coupled to the data storage system 100 and to store data in the data storage system 100. The host device 104 may be a computing system such as a personal computer, a server, a workstation, a laptop computer, a personal digital assistant (PDA), a smart phone, or the like. Alternatively, the host device 104 may be an electronic device such as a digital camera, a digital audio player, a digital video recorder, or the like.

In some implementations, the storage medium 102 represents volatile memory used to temporarily store data and information used to manage the data storage system 100. According to aspects of the subject technology, the storage medium 102 is random access memory (RAM), such as double data rate (DDR) RAM. Other types of RAM may be also used to implement the storage medium 102. The storage medium 102 may be implemented using a single RAM module or multiple RAM modules. While the storage medium 102 is depicted as being distinct from the controller 101, those skilled in the art will recognize that the storage medium 102 may be incorporated into the controller 101 without departing from the scope of the subject technology. Alternatively, the storage medium 102 may be a non-volatile memory, such as a magnetic disk, flash memory, peripheral SSD, and the like.

As further depicted in FIG. 1, the data storage system 100 may also include the host interface 105. The host interface 105 may be configured to be operably coupled (e.g., by wired or wireless connection) to the host device 104, to receive data from the host device 104 and to send data to the host device 104. The host interface 105 may include electrical and physical connections, or a wireless connection, for operably coupling the host device 104 to the controller 101 (e.g., via the I/O interface of the controller 101). The host interface 105 may be configured to communicate data, addresses, and control signals between the host device 104 and the controller 101. Alternatively, the I/O interface of the controller 101 may include and/or be combined with the host interface 105. The host interface 105 may be configured to implement a standard interface, such as a small computer system interface (SCSI), a serial-attached SCSI (SAS), a fiber channel interface, a peripheral component interconnect express (PCIe), a serial advanced technology attachment (SATA), a universal serial bus (USB), a nonvolatile memory express (NVMe), or the like. The host interface 105 may be configured to implement only one interface. Alternatively, the host interface 105 (and/or the I/O interface of controller 101) may be configured to implement multiple interfaces, which may be individually selectable using a configuration parameter selected by a user or programmed at the time of assembly. The host interface 105 may include one or more buffers for buffering transmissions between the host device 104 and the controller 101.

The flash memory 103 may represent a non-volatile memory device for storing data. According to aspects of the subject technology, the flash memory 103 includes, for example, a not-and (NAND) flash memory. The flash memory 103 may include a single flash memory device or chip, or (as depicted in FIG. 1) may include multiple flash memory devices or chips arranged in multiple channels. The flash memory 103 is not limited to any particular capacity or configuration. For example, the number of physical blocks, the number of physical pages per physical block, the number of sectors per physical page, and the size of the sectors may vary within the scope of the subject technology.

The flash memory may have a standard interface specification so that chips from multiple manufacturers can be used interchangeably (at least to a large degree). The interface hides the inner working of the flash and returns only internally detected bit values for data. In aspects, the interface of the flash memory 103 is used to access one or more internal registers 106 and an internal flash controller 107 for communication by external devices (e.g., the controller 101). In some implementations, the registers 106 may include address, command, and/or data registers, which internally retrieve and output the necessary data to and from a NAND memory cell array 108. A NAND memory cell array 108 may be sometimes referred to as a NAND array, a memory array, or a NAND. For example, a data register may include data to be stored in the memory array 108, or data after a fetch from the memory array 108 and may also be used for temporary data storage and/or act like a buffer. An address register may store the memory address from which data will be fetched to the host device 104 or the address to which data will be sent and stored. In some implementations, a command register is included to control parity, interrupt control, and the like. In some implementations, the internal flash controller 107 is accessible via a control register to control the general behavior of the flash memory 103. The internal flash controller 107 and/or the control register may control the number of stop bits, word length, receiver clock source, and may also control switching the addressing mode, paging control, coprocessor control, and the like.

In some implementations, the registers 106 may also include a test register. The test register may be accessed by specific addresses and/or data combinations provided at the interface of flash memory 103 (e.g., by specialized software provided by the manufacturer to perform various tests on the internal components of the flash memory). In further aspects, the test register may be used to access and/or modify other internal registers, for example the command and/or control registers. In some implementations, test modes accessible via the test register may be used to input or modify certain programming conditions of the flash memory 103 (e.g., read levels) to dynamically vary how data is read from the memory cells of the memory arrays 108. The registers 106 may also include one or more data latches coupled to the flash memory 103.

It should be understood that in all cases data may not always be the result of a command received from the host 104 and/or returned to the host 104. In some implementations, the controller 101 may be configured to execute a read operation independent of the host 104 (e.g., to verify read levels or a bit error rate (BER)). The predicate words "configured to," "operable to," and "programmed to" as used herein do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Performance of a data storage device 100 may be based on factors such as a data transfer rate, latency, and inputs/outputs per second (IOPS). When measuring performance based on these factors, a host may subject the data storage devices to different types of workloads (e.g., write-only, read-only, and mixed), with each type of workload corresponding to a different intended use of the data storage device.

Read-only workloads include a plurality of read commands sent to a data storage device 100 by a host 104, and they may be used to characterize the read performance of the data storage device 100. Write-only workloads include a plurality of write commands sent to a data storage device 100 by a host 104, and they may be used to characterize the write performance of the data storage device 100. Mixed workloads include a combination of both write and read commands sent to a data storage device 100 by a host 104, and they may be used to characterize the IOPS of the data storage device 100.

Mixed workloads may include random write and/or read patterns (e.g., for testing the ability of the data storage device to write and read small files scattered throughout the drive) or sequential write and/or read patterns (e.g., for testing the ability of the data storage device to write and read large files to and from the drive). Random write/read patterns cause memory dies in flash memories 103 to be accessed randomly, while sequential write/read patterns cause memory dies in flash memories 103 to be accessed sequentially. The term "sequential" in the context of a sequential write and/or read pattern relates to writing to and/or reading from one memory die and then to another memory die sequentially in time. However, the order of the memory dies used to write and/or read data can be one of a variety of orders (e.g., a sequential order, a random order, or one of a variety of orders).

The data to be written and read in a write/read test may include stripes of data comprising a plurality of data allocation units (AUs) and a parity AU. For instance, a superblock may be split into a plurality of data AUs (e.g., a plurality of blocks or other groups of data), each to be written to a separate memory group (e.g., to a separate flash memory 103 or to a separate array 108 within a flash memory 103). A parity AU may be determined based on, for example, an exclusive-or (XOR) operation using the data AUs as inputs. The data and parity AUs together may comprise a data stripe, which can be recovered by accessing each memory die, and reading the AUs for the data stripe stored in each of the accessed memory dies. The order in which memory dies are accessed to write AUs for a given data stripe may be referred to as the write order, and the order in which memory dies are accessed to read AUs for a given data stripe may be referred to as the read order.

The AUs for a given data stripe may be written to logic block addresses (LBAs), which are converted to physical addresses corresponding to physical memory dies in the data storage device 100. While memory dies are referred to throughout this disclosure, other types of memory groups may be used in other implementations. The memory dies may correspond to flash memories 103, with one memory die per flash memory 103 or a plurality of memory dies per flash memory 103.

Due to the nature of a write/read test, which includes writing logic block addresses (LBAs) and then reading back the data written, the write stripe may eventually align with the read stripe, which causes the read operations to take place concurrently with (overlap) write operations on the same die. In other words, the controller 101 may attempt to read a memory die that is being written at the time of the read operation. This requires the read operation to suspend the write operation, impacting the read throughput as well as the write throughput. This creates drops in performance, consistency issues, and impacts QoS where reads are suspending writes.

Figure 2:
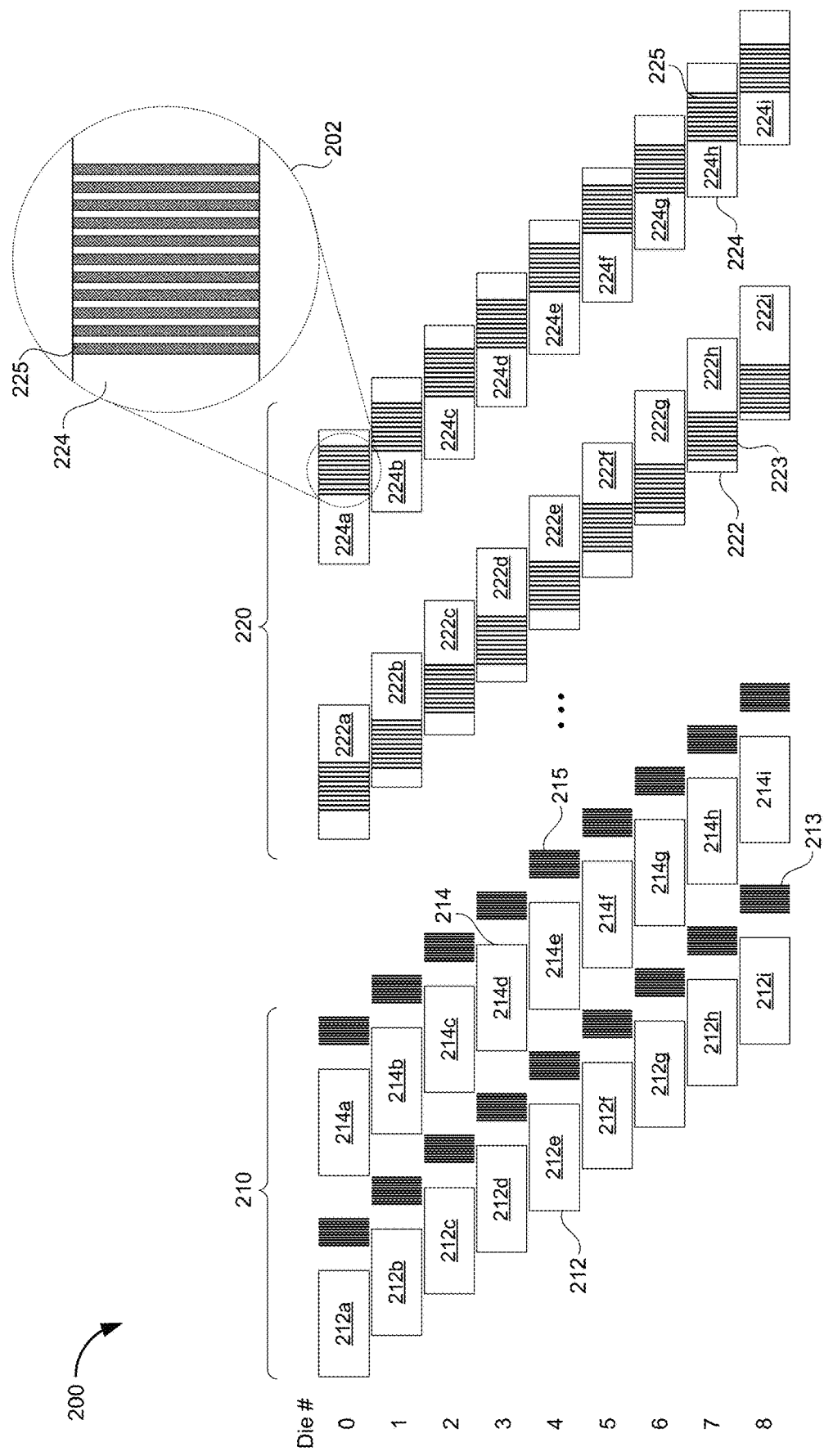
FIG. 2 is an example timing diagram of a sequential mixed workload processing scheme showing read collisions.

FIG. 2 is an example timing diagram of a sequential mixed workload processing scheme 200 showing read collisions 202. In section 210, a first superblock is apportioned and sequentially written using a sequence of write operations 212 to a plurality of memory dies 0 through 8. While this figure shows 9 memory dies, there may be any number of memory dies (e.g., 16 memory dies or 32 memory dies). Thus, The examples in the figures may show portions of superblocks, indicating just 9 of (for example) 32 dies.

For example, a first portion of the first superblock is written in operation 212a to die 0, followed by a second portion of the first superblock being written in operation 212b to die 1, and so forth. Subsequent to each write operation 212, a read operation (e.g., 213) takes place, during which the host 104 may cause the data that was just written to each memory die to be read.

During time period 210, write operations 212a-212i sequentially cause respective portions of data of a first superblock to be written to respective memory dies, and write operations 214a-214i sequentially cause respective portions of data of a second superblock to be written to respective memory dies. Subsequent to each write operation, a read operation (e.g., read operations 213 or 215) causes the data to be read from the respective memory dies. The write operations 212 and 214 do not overlap with the read operations 213 and 215.

During time period 220, which takes place subsequent to time period 210 (e.g., at a later point in the mixed workload), write operations 222a-222i sequentially cause respective portions of data of a third superblock to be written to respective memory dies, and write operations 224a-224i sequentially cause respective portions of data of a fourth superblock to be written to respective memory dies. Corresponding to each write operation (e.g., 222a-222i or 224a-224i), a read operation (e.g., read operation 223 or 225) causes the data to be read from the respective memory dies. The write operations 222 and 224 overlap (in time and in physical location) with the read operations 223 and 225, causing a reduction in performance, which is identified by the larger gaps between work on the dies. Time period 220 shows the worst case scenario in the context of read collisions. The gap between read operations (e.g., 225) when aligned with a program operation (e.g., 224) indicates the additional time needed to suspend the write operation multiple times, which increases the program time.

To be clear, the write and read operations overlap both in terms of time and physical location, and these overlaps cause drops in performance. For example, read operations 225 in die 0 are to the same block that write operations 224 in die 0 are being performed on, which triggers a suspension of the program operation. This suspension causes a drop in performance. The drop in performance comes from the need to suspend the program operation and inject the read operation, which results in the program operation being longer (due to the suspension) and the read operation having to wait for the die to suspend, issue the read, then resume (repeating as required).

The sequential nature of the write and read patterns results in very strict ordering where the dies are used in a nominal order (e.g., die 0, 1, 2, 3, 4 . . . ) without randomness being introduced. The challenge of a sequential 50/50 mix (50% write operations and 50% read operations) is matching the read IOPS with the write IOPS. In other words, a data storage device 100 may be expected to deliver the same read throughput and write throughput. Given the expectation of equal throughput, the controller 101 may attempt to match one operation type (read or write) with the other operation type (read or write) down to the die level, no matter what the program pattern is. In another words, the read operations may collide with the write operations no matter what the program order is, as the data is sequentially requested from each memory die. The colliding of a read operation with a write operation is referred to herein as a read collision, but may also be referred to as a write collision, or more generally, a memory operation collision.

While processing sequential mixed workloads, conventional data storage devices are challenged by read collisions as shown in time period 220. At first, read handling may be unthrottled until it hits a system bottleneck. As such, read operations increase, which causes more write operations to be suspended during the read collisions, which causes the speed of write operations to decrease, which causes read operations to throttle back, which causes collisions to decrease, which causes write speed to recover, which causes read speed to increase again, which restarts the cycle. The read collision avoidance schemes described in the present application prevent the aforementioned scenario.

In some implementations, controller 101 may re-introduce randomness to the die selection process. If a random die is selected as the next die to write, this can help to break the pattern seen in time period 220, and offer some improvement to the overlap. The benefit of this approach is that no intelligence is required, which means very little processing overhead. By departing from write patterns with closer (more adjacent) die selection as shown in FIG. 2, write throughput may decrease. Further, there is no guarantee that such an approach will decrease the total amount of read collisions over time.

Figure 3:
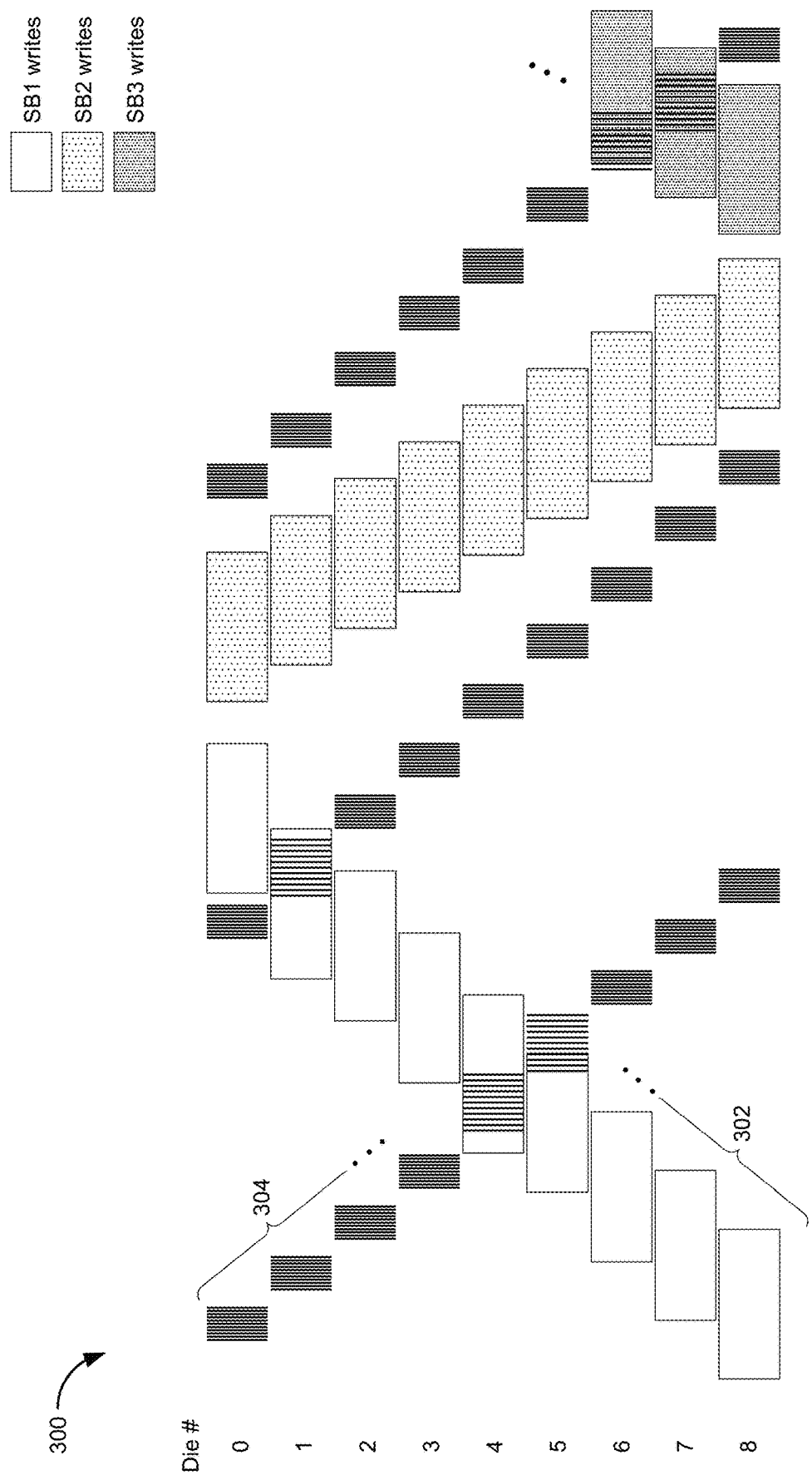
FIG. 3 is an example timing diagram of a read collision avoidance scheme using alternating write patterns in accordance with some implementations.

FIG. 3 is an example timing diagram of a read collision avoidance scheme 300 using alternating write patterns in accordance with some implementations. According to this scheme, when selecting memory dies to program, for each new superblock, the controller 101 alternates the order that the dies are selected. For example, a first superblock SB1 may be written in the die order of 31, 30, 29, . . . , 2, 1, 0; and a second superblock SB2 (immediately following the first superblock SB1) may be written in the opposite die order of 0, 1, 2, . . . , 29, 30, 31. The following superblock SB3 may be written in the die order of 31, 30, 29, . . . , 2, 1, 0, and so forth. Thus, alternating superblocks may be programmed using write patterns having opposite die selection orders. Please note that simply for ease of illustration, FIG. 3 shows dies 0, 1, 2, . . . 8 (instead of dies 0, 1, 2, . . . 29, 30, 31).

The benefit to scheme 300 is that the sequential read operations will not be directly aligned to the order of the sequential write operations. Thus, improvements in performance may be gained due to the reduction in overlap of write operations and read operations. In scheme 300, there may still be some read collisions. For example, the first SB1 has read collisions on dies 1, 4, and 5. However, the amount of read collisions may be substantially decreased compared to the worst case scenario in time period 220 of FIG. 2.

Thus, by alternating the write patterns for successively programmed superblocks as shown in scheme 300, IOPS of the data storage device 100 may be increased, causing performance to be optimized and QoS to be improved.

FIG. 4 is an example timing diagram of a read collision avoidance scheme 400 using write patterns with random starting dies in accordance with some implementations. According to this scheme, when selecting memory dies to program, for each new superblock, the controller 101 randomly (or substantially randomly) selects a memory die on which the write stripe starts. For example, a first superblock SB1 may be written in the die order of 4, 5, 6, . . . 1, 2, 3; and a second superblock SB2 (immediately following the first superblock SB1) may be written in the die order of 2, 3, 4, . . . , 0, 1. Thus, successively programmed superblocks may begin being programmed on memory dies (e.g., die 2 for SB2) independently of the memory dies on which previously programmed superblocks began being programmed on (e.g., die 4 for SB1). Stated another way, for each new superblock being programmed, the controller 101 selects a random (or substantially random) starting point.

The benefit to scheme 400 is that there will be fewer read collisions; thus, improvements in performance may be gained due to the reduction in overlap of write operations and read operations. In scheme 400, there may still be some read collisions. For example, the first SB1 has read collisions on dies 0, 1, 2, and 3. However, the amount of read collisions may be substantially decreased compared to the worst case scenario in time period 220 of FIG. 2.

Thus, by randomly (or substantially randomly) selecting new starting points for programming successive superblocks as shown in scheme 400, IOPS of the data storage device 100 may be increased, causing performance to be optimized and QoS to be improved.

In some implementations, another read collision avoidance scheme may include selecting the memory die to write next as the memory die that was most recently read. Since the data is read sequentially, the next memory die to read will follow the pattern for which the memory dies were written. If the controller 101 selects the memory die to write to be the memory die on which a read operation was just completed from the previous write cycle, the controller 101 can minimize the overlap between write operations and read operations on the same memory die. Given that the controller 101 would use the knowledge of the memory die last read, the read and write orders may become randomized based on the read pattern, and for each write operation, the memory die to be written will shift in relation to the memory dies that were just read.

Figure 5A:
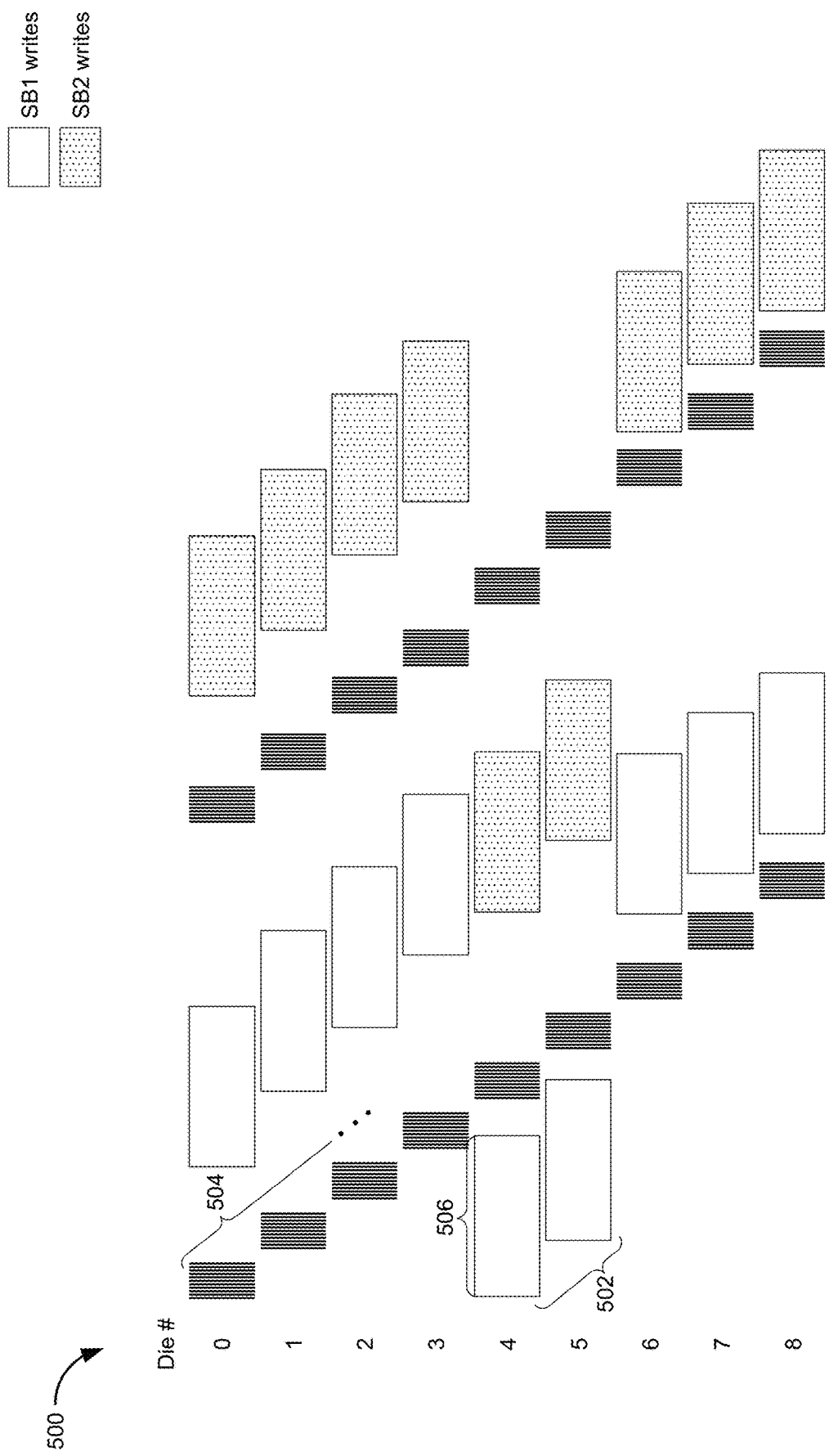
FIGS. 5A-5B are example timing diagrams of a read collision avoidance scheme using dynamically updating write patterns in accordance with some implementations.
Figure 5B:
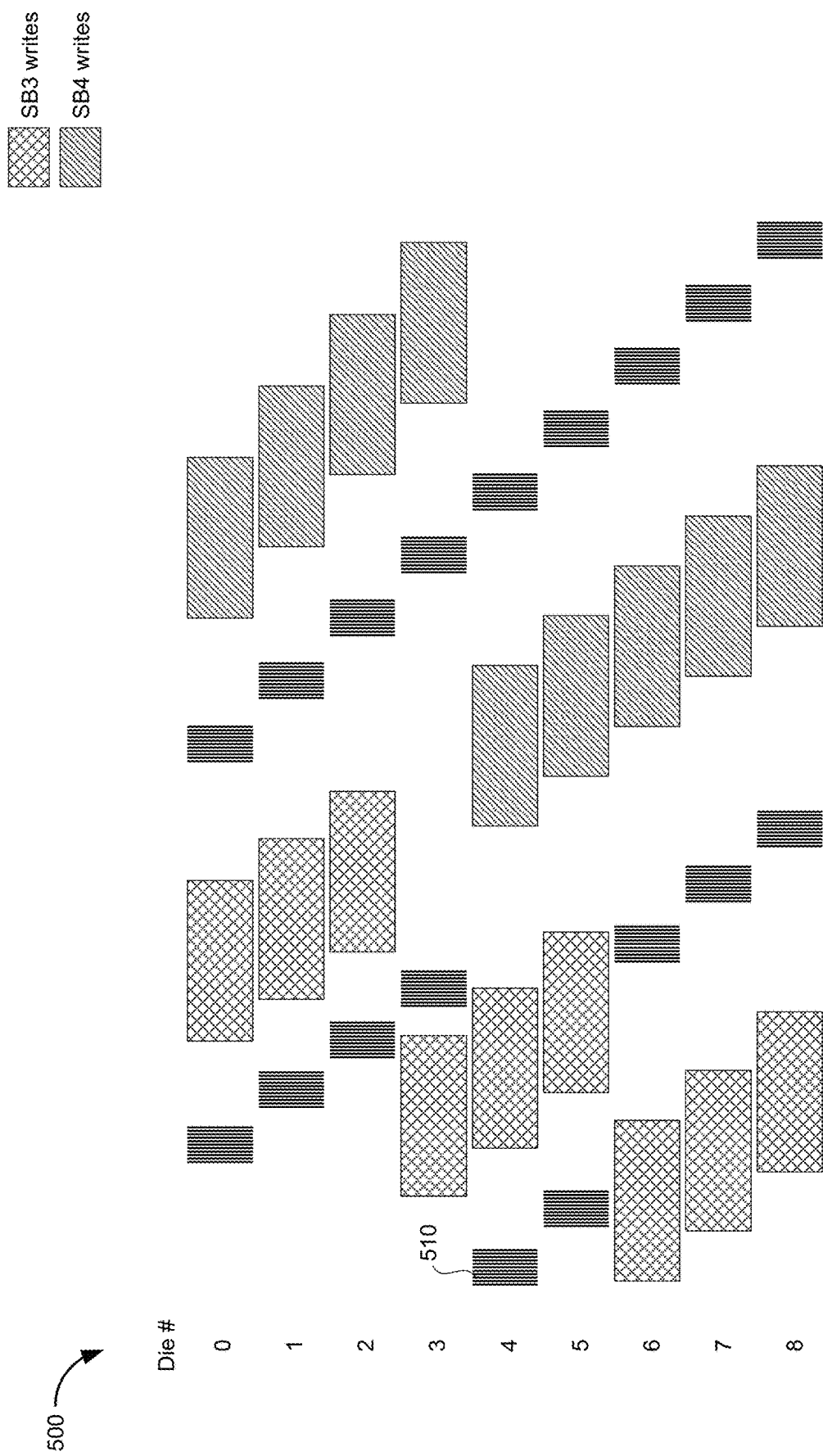

FIGS. 5A-5B are example timing diagrams of a read collision avoidance scheme 500 using dynamically updating write patterns in accordance with some implementations. According to this scheme, when selecting memory dies to program, for each new superblock, the controller 101 detects which memory die(s) will be read next and selects a memory die for writing for which the write operation will be complete before the next read operation on that memory die begins.

In some implementations, the controller 101 may detect which memory die(s) will be read next by detecting sequential read workloads and using a sequential read ahead (SRA) algorithm to determine which memory die(s) will be programmed next (at the time of memory die selection for programming a new superblock). In some implementations, the controller 101 may use the SRA by detecting the read pattern up to the current point and extrapolating the next memory die(s) that will be read based on previously read memory dies according to the detected read pattern. In some implementations, the controller 101 obtains the logical read addresses from the SRA and uses L2P tables to determine the physical addresses, and by extension, which memory dies will be read from moving forward.

Upon determining which memory die(s) will be read next, the controller 101 may set up a write exclusion zone and re-order the program order to avoid the memory die(s) that are to be read, if those memory die(s) will be read before the next write operation(s) on those memory die(s) are complete, thereby ensuring that the write operations do not overlap with read operations.

For example, referring to FIG. 5A, although memory dies 0 and 1 would have been first in the program order, the controller 101 detects that the next read operations will fall on memory dies 0 and 1 as the next sequential read operations. The controller 101 detects this, and knowing the program duration 506, selects memory dies 4 and 5 as the first two memory dies to write for this stripe (for the first superblock SB1). The controller 101 then resumes with the previously selected write order, skipping the memory dies that have been already written for the current stripe. Here, that order is memory dies 0, 1, 2, 3, (skipping 4 and 5), 6, 7, 8. This avoids the read collisions that would otherwise occur on memory dies 4 and 5. The controller 101 may make the same decision when starting the write operations for the next superblock SB2, where again memory dies 0 and 1 would overlap with the read operations that have been sent to memory dies 0 and 1.

Thus, in scheme 500, write operations are effectively reordered, modified, and/or mapped around the read operations (by using knowledge of the sequential read logical addresses obtained from the SRA), thus avoiding all (or substantially all) read collisions. Thus, in scheme 500, by avoiding read collisions in this manner, IOPS of the data storage device 100 may be increased, causing performance to be optimized and QoS to be improved In some implementations, the controller 101 use the degrees of freedom (DoF) that are available when writing to a superblock to dynamically modify the order to ensure that memory dies that will be used for read operations are free when the read operations are sent to the memory dies. DoF are based on how much of the superblock remains to be written. For example, when starting the programming of a new superblock, that superblock has a high DoF, since all of the memory dies are available to program the write stripe. Halfway through programming the superblock, only half of the memory dies are available, so the DoF is lower. As the end of programming operations is near for a given superblock, the DoF is at its lowest. The lower the DoF, the fewer options scheme 500 has in modifying the write order. Similarly, the higher the DoF, the more options scheme 500 has in modifying the write order.

FIG. 5B is an extension in time of FIG. 5A and shows how the dynamic write allocation may change the read pattern. This is because the logical data written does not change, meaning that the sequential read of the data may shift its order as the write pattern continues. As a result, scheme 500 redirects the writes to avoid possible new read collisions.

For example, given the write operation for the previous superblock SB2 (FIG. 5A) used memory dies 4 and 5 first, the sequential read operations for that superblock (shown in FIG. 5B, beginning with read operations 510) will result in those memory dies being read first, followed by 0-3, then 6-8, and so forth. When it is time to begin writing the next superblock SB3, scheme 500 is aware of the sequential read operations on memory dies 4-5 and 0-3, and starts writing to memory dies 6-8 (to avoid read collisions on memory dies 4-5 and 0-3), before selecting memory die 3 (to avoid read collisions on memory dies 0-2), because there is sufficient time to perform the write operation on memory die 3 before the read operation would reach that memory die.

As discussed above, the dynamic nature of scheme 500 relies on the DoF available. If scheme 500 is unable to schedule a write operation to a memory die where a read operation would not overlap, due to insufficient DoF, the program suspend behavior (e.g., as shown in 202, FIG. 2) would be encountered. The higher the DoF, the easier it is to schedule around the read operations.

In some implementations, using knowledge of the host side operations, scheme 500 can use accounting of the read/write balance to reference in runtime and rebalance the priority of reads and writes to prevent the data storage device 100 from reaching the throughput limits and being throttled back by the host 104. Controller 101 slices out the per-die handling for both read operations and write operations so the memory dies can achieve and maintain a balance. In order to do so, the controller 101 may not always let read operations go through to the memory dies first (the read operations may be throttled back), and the controller 101 may re-balance the priority of read operations and write operations from time to time so the balance can be maintained.

Figure 6:
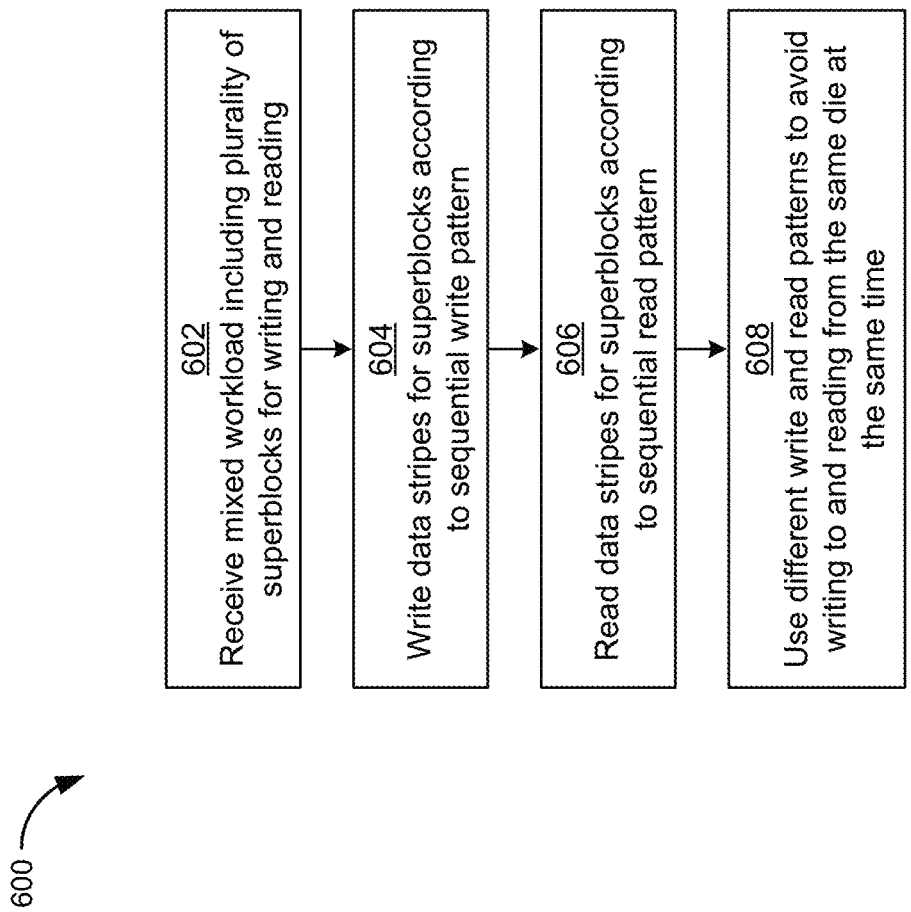
FIG. 6 is a flowchart of an example of a read collision avoidance method in accordance with some implementations.

FIG. 6 is a flowchart of an example of a read collision avoidance method 600 in accordance with some implementations. In the example method 600, the controller (e.g., 101) for a data storage device (e.g., 100) comprising a non-volatile memory comprising a plurality of memory dies (e.g., 103) receives (602) a mixed workload from the controller including a plurality of superblocks (e.g., SB1, SB2, and so forth, in FIGS. 3-5B) to be written to and read from the plurality of memory dies (e.g., dies 0-8 in FIGS. 3-5B), each of the plurality of superblocks to be apportioned among the plurality of memory dies (e.g., as in 212*a* through 212*i* in FIG. 2).

In one or more implementations, according to the mixed workload, the controller writes a first data stripe (e.g., SB1) associated with a first superblock of the plurality of superblocks to the plurality of memory dies according to a sequential write pattern (e.g., as discussed above with reference to any of FIGS. 3-5B); and reads the first data stripe (e.g., SB1) associated with the first superblock from the plurality of memory dies according to a sequential read pattern.

In one or more implementations, the sequential write pattern causes the controller to write to the plurality of memory dies in a first order of memory dies and read from the plurality of memory dies in a second order of memory dies different from the first order of memory dies (e.g., as discussed above with reference to any of FIGS. 3-5B).

In one or more implementations, the controller is further configured to, while writing the first data stripe associated with the first superblock to the plurality of memory dies (e.g., 302 in FIG. 3, 402 in FIG. 4, 502 in FIG. 5A), read a previously written data stripe associated with a previously written superblock of the plurality of superblocks from the plurality of memory dies (e.g., 304 in FIG. 3, 404 in FIG. 4, 504 in FIG. 5A). In one or more implementations, the controller is configured to read the previously written data stripe using the sequential read pattern (using the same sequential read pattern as that used for reading the first data stripe).

In one or more implementations, the differences in the first order and the second order cause the controller to avoid simultaneously writing to and reading from a same memory die of the plurality of memory dies (avoid read collisions as described above with reference to any of FIGS. 3-5B). In one or more implementations, the plurality of memory dies includes a total of N memory dies, N being an integer greater than or equal to 2 (e.g., N=8), and differences in the first order and the second order cause the controller to simultaneously write to and read from a same memory die of the plurality of memory dies fewer than N/2 times while a given data stripe is being written (e.g., there are fewer than 4 read collisions throughout the writing of a given superblock).

In one or more implementations, the mixed workload is characterized by 50% write commands and 50% read commands, and each write command included in the mixed workload corresponds to a respective read command included in the mixed workload.

In one or more implementations, the first order associated with the sequential write pattern is a substantially random order; and the second order associated with the sequential read pattern is a sequential order.

In one or more implementations, the first order associated with the sequential write pattern alternates between a first sequential order having a first sequence of memory dies (e.g., SB1 in FIG. 3) and a second sequential order having a second sequence of memory dies opposite the first sequence of memory dies (e.g., SB2 in FIG. 3); and the second order associated with the sequential read pattern is a sequential order having the first sequence of memory dies.

In one or more implementations, the first order associated with the sequential write pattern is a sequential order that begins with a random memory die of the plurality of memory dies for each successive data stripe being written (e.g., SB1 in FIG. 4 begins being programmed on memory die 4); and the second order associated with the sequential read pattern is a sequential order that begins with a same memory die of the plurality of memory dies for each successive data stripe being read (e.g., memory die 0 in FIG. 4).

In one or more implementations, the first order associated with the sequential write pattern is a sequential order that begins with a memory die being identified as a last memory die used to read prior to writing a given data stripe; and the second order associated with the sequential read pattern is a sequential order that begins with a same memory die of the plurality of memory dies for each successive data stripe being read.

In one or more implementations, the controller is configured to detect one or more future read operations using an SRA algorithm (e.g., 504 in FIG. 5A); and based on the one or more future read operations, reorder the first order associated with the sequential write pattern to avoid writing to any memory dies of the plurality of memory dies while they are being read (e.g., write to memory dies 4 and 5 in FIG. 5A first in order to avoid writing to memory dies 0-3 on which read operations would not be complete before write operations begin).

In one or more implementations, the controller is configured to reorder the first order based on a DoF associated with the first order for a given data strip (e.g., higher DoF towards the beginning of a program operation enables more choices for modifying the write order to avoid read collisions, as discussed above with reference to FIGS. 5A-5B).

Thus, the read collision avoidance schemes described above enable data storage devices 100 to process sequential mixed workloads with higher performance and improved QoS, while also potentially reducing power, as cases in which write operations and read operations are active on the same memory die at the same time would be reduced, and in some cases, eliminated.

In one or more examples, the controller 101 may perform the schemes/methods 200, 300, 400, 500 and 600. In one or more examples, the controller 101 may perform such schemes/methods in conjunction with one or more other components illustrated in FIG. 1.

In one or more aspects, a method includes one or more methods, operations or portions thereof described herein. In one or more aspects, an apparatus includes one or more memories and one or more processors, the one or more processors configured to cause performing one or more methods, operations or portions thereof described herein. In one or more aspects, an apparatus includes means adapted for performing one or more methods, operations or portions thereof described herein. In one or more aspects, a hardware apparatus includes circuits configured to perform one or more methods, operations or portions thereof described herein. In one or more aspects, an apparatus includes components operable to carry out one or more methods, operations or portions thereof described herein. In one or more aspects, a non-transitory machine-readable storage medium (e.g., one or more memories and/or one or more registers) store instructions that, when executed by one or more processors, cause one or more processors to perform one or more methods, operations or portions thereof described herein.

Further examples of the subject technology include various subsets of the above examples combined or otherwise re-arranged in various forms.

In some examples, to illustrate the interchangeability of hardware and software, items such as the various illustrative blocks, modules, components, methods, operations, instructions, and algorithms may have been described generally in terms of their functionality. In some examples, whether such functionality is implemented as hardware, software or a combination of hardware and software depends upon the particular application and design constraints imposed on the overall system. Skilled artisans may implement the described functionality in varying ways for each particular application.

Headings and subheadings, if any, are used for convenience only and do not limit the invention. The word "exemplary" is used to mean serving as an example or illustration. Any implementation described herein as an "example" is not necessarily to be construed as preferred or advantageous over other implementations. Relational terms such as first and second and the like may be used simply for ease of understanding without necessarily requiring or implying any actual relationship or order between elements or actions and without necessarily requiring or implying that they have different characteristics unless stated otherwise.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" and "at least one of A, B, or C" may refer to only A, only B, or only C; any combination of A, B, and C; and/or at least one of each of A, B, and C.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C. Furthermore, an expression "element A/element B" may be understood as element A and/or element B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two.

In one or more aspects, the terms "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

Features of various embodiments of the present disclosure may be partially or wholly coupled to or combined with each other and may be variously inter-operated, linked or driven together. The embodiments of the present disclosure may be carried out independently from each other or may be carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order, with the exception of steps and/or operations necessarily occurring in a particular order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In describing a temporal relationship, when the temporal order is described as, for example, "after," "subsequent," "next," "before," "preceding," "prior to," or the like, a case that is not consecutive or not sequential may be included unless a more limiting term, such as "just," "immediate(ly)," or "direct(ly)," is used.

It is understood that, although the term "first," "second," or the like may be used herein to describe various elements, these elements should not be limited by these terms. These terms are only used to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

In one or more examples, when an element is "connected" or "coupled" to another element, the element can be directly connected or coupled to another element, and can be indirectly connected or coupled to another element with one or more intervening elements disposed or interposed between the elements, unless otherwise specified.

The disclosure is provided to enable any person skilled in the art to practice the various aspects described herein. In some instances, when a detailed description of well-known functions or configurations may unnecessarily obscure aspects of the present disclosure, the detailed description thereof may be omitted. The disclosure provides various examples of the subject technology, and the subject technology is not limited to these examples. Various modifications to these aspects will be readily apparent to those skilled in the art, and the principles described herein may be applied to other aspects.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

The shapes, sizes, areas, ratios, numbers, and the like disclosed in the drawings for describing implementations of the present disclosure are merely examples, and thus, the present disclosure is not limited to the illustrated details.

When the term "comprise," "have," "include," "contain," "constitute," or the like is used, one or more other elements may be added unless a term such as "only" or the like is used. The terms used in the present disclosure are merely used in order to describe particular embodiments, and are not intended to limit the scope of the present disclosure. The terms used herein are merely used in order to describe example embodiments, and are not intended to limit the scope of the present disclosure. The terms of a singular form may include plural forms unless the context clearly indicates otherwise. An element proceeded by "a," "an," "the," or "said" does not, without further constraints, preclude the existence of additional elements.

In one or more aspects, an element, feature, or corresponding information (e.g., a level, range, dimension, size, or the like) is construed as including an error or tolerance range even where no explicit description of such an error or tolerance range is provided. An error or tolerance range may be caused by various factors (e.g., process factors, internal or external impact, or the like). Furthermore, while the subject disclosure may provide many example ranges and values, these are non-limiting examples, and other ranges and values are within the scope of the subject technology.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The description provided in the background section should not be assumed to be prior art merely because it is mentioned in or associated with the background section. The background section may include information that describes one or more aspects of the subject technology, and the description in this section does not limit the invention.

In addition to the description provided in the summary section, other systems, methods, features and advantages will be, or will become, apparent to one with skill in the art upon examination of the present disclosure. It is intended that all such additional systems, methods, features and advantages be within the scope of the present disclosure, and be protected by the following claims. Nothing in the summary section should be taken as a limitation on those claims. Further aspects and advantages are also discussed herein.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A data storage device, comprising:
a non-volatile memory comprising a plurality of memory dies; and
a controller configured to control the non-volatile memory and communicate with a host, wherein the controller is configured to:
receive a mixed workload including a plurality of superblocks to be written to and read from the plurality of memory dies, each of the plurality of superblocks to be apportioned among the plurality of memory dies;

write a first data stripe associated with a first superblock of the plurality of superblocks to the plurality of memory dies according to a sequential write pattern; and read the first data stripe associated with the first superblock from the plurality of memory dies according to a sequential read pattern, wherein:

the sequential write pattern causes the controller to write to the plurality of memory dies in a first order of memory dies; and the sequential read pattern causes the controller to read from the plurality of memory dies in a second order of memory dies different from the first order of memory dies, and wherein:

the first order associated with the sequential write pattern is a random order, and the second order associated with the sequential read pattern is a sequential order; or the controller is configured to, based on one or more future read operations, reorder the first order associated with the sequential write pattern to avoid writing to any memory dies of the plurality of memory dies while they are being read.

2. The data storage device of claim 1, wherein the controller is further configured to, while writing the first data stripe associated with the first superblock to the plurality of memory dies, read a previously written data stripe associated with a previously written superblock of the plurality of superblocks from the plurality of memory dies.

3. The data storage device of claim 2, wherein the controller is configured to read the previously written data stripe using the sequential read pattern.

4. The data storage device of claim 1, wherein differences in the first order and the second order cause the controller to avoid simultaneously writing to and reading from a same memory die of the plurality of memory dies.

5. The data storage device of claim 1, wherein:

the plurality of memory dies includes a total of N memory dies, N being an integer greater than or equal to 2; and differences in the first order and the second order cause the controller to simultaneously write to and read from a same memory die of the plurality of memory dies fewer than N/2 times while a given data stripe is being written.

6. The data storage device of claim 1, wherein:

the mixed workload is characterized by 50% write commands and 50% read commands; and each write command included in the mixed workload corresponds to a respective read command included in the mixed workload.

7. The data storage device of claim 1, wherein the controller is configured to:

detect the one or more future read operations using a sequential read ahead algorithm.

8. The data storage device of claim 7, wherein the controller is configured to reorder the first order based on a degree of freedom associated with the first order for a given data stripe.

9. A method of operating a data storage device, the method comprising:

at a data storage device including a non-volatile memory comprising a plurality of memory dies, and a controller configured to control the non-volatile memory and communicate with a host:

receiving a mixed workload including a plurality of superblocks to be written to and read from the plurality of memory dies, each of the plurality of superblocks to be apportioned among the plurality of memory dies;

writing a first data stripe associated with a first superblock of the plurality of superblocks to the plurality of memory dies according to a sequential write pattern; and reading the first data stripe associated with the first superblock from the plurality of memory dies according to a sequential read pattern, wherein:

the sequential write pattern causes the controller to write to the plurality of memory dies in a first order of memory dies; and the sequential read pattern causes the controller to read from the plurality of memory dies in a second order of memory dies different from the first order of memory dies, and wherein:

the first order associated with the sequential write pattern alternates between:

a first sequential order having a first sequence of memory dies; and a second sequential order having a second sequence of memory dies opposite the first sequence of memory dies; and the second order associated with the sequential read pattern is a sequential order having the first sequence of memory dies.

10. The method of claim 9, wherein:

the mixed workload is characterized by 50% write commands and 50% read commands; and each write command included in the mixed workload corresponds to a respective read command included in the mixed workload.

11. A data storage device, comprising:

a non-volatile memory comprising a plurality of memory dies; and a controller configured to control the non-volatile memory and communicate with a host, wherein the controller includes:

means for receiving a mixed workload including a plurality of superblocks to be written to and read from the plurality of memory dies, each of the plurality of superblocks to be apportioned among the plurality of memory dies;

means for writing a first data stripe associated with a first superblock of the plurality of superblocks to the plurality of memory dies according to a sequential write pattern; and means for reading the first data stripe associated with the first superblock from the plurality of memory dies according to a sequential read pattern, and wherein:

the sequential write pattern causes the means for writing to write to the plurality of memory dies in a first order of memory dies; and the sequential read pattern causes the means for reading to read from the plurality of memory dies in a second order of memory dies different from the first order of memory dies, and wherein:

the first order associated with the sequential write pattern is a sequential order that begins with a random memory die of the plurality of memory dies for each successive data stripe being written, or that begins with a memory die being identified as a last memory die used to read prior to writing a given data stripe; and the second order associated with the sequential read pattern is a sequential order that begins with a same memory die of the plurality of memory dies for each successive data stripe being read.

* * * * *